United States Patent
Rodrigues et al.

(10) Patent No.: US 7,169,862 B2
(45) Date of Patent: Jan. 30, 2007

(54) SOLVENT-BORNE TWO COMPONENT MODIFIED EPOXY/POLYAMINE COATING COMPOSITION

(75) Inventors: Cesar A. S. Rodrigues, Porto Alegre (BR); Luis Henrique De Almeida Ferrari, Canoas (BR); Andrew P. Stamegna, Wilmington, DE (US); Valentina Gordin, Princeton, NJ (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 279 days.

(21) Appl. No.: 10/673,832

(22) Filed: Sep. 29, 2003

(65) Prior Publication Data

US 2005/0070674 A1 Mar. 31, 2005

Related U.S. Application Data

(60) Provisional application No. 60/416,053, filed on Oct. 4, 2002.

(51) Int. Cl.
*B32B 15/08* (2006.01)
*C08L 63/02* (2006.01)

(52) U.S. Cl. ................ 525/528; 428/416; 428/418
(58) Field of Classification Search .................. None
See application file for complete search history.

(56) References Cited

U.S. PATENT DOCUMENTS 3,562,081 A * 2/1971 Stalego ................ 442/332
3,759,751 A   9/1973 Smith
4,282,123 A * 8/1981 Ilaria .................... 528/59
4,430,479 A * 2/1984 Merton et al. ........... 525/127
4,486,556 A * 12/1984 Kordomenos et al. ...... 523/400
4,520,144 A   5/1985 Noren et al.
4,775,600 A * 10/1988 Adaniya et al. .......... 428/623
6,391,970 B1  5/2002 Gupta et al.

FOREIGN PATENT DOCUMENTS

| EP | 0 230 145 A | 7/1987 |
| EP | 0874 013 A | 10/1998 |
| JP | 08325349 A * | 12/1996 |

* cited by examiner

*Primary Examiner*—Robert Sellers

(57) ABSTRACT

A coating composition comprising a film forming binder of
a. a modified polyepoxy resin comprising the reaction product of a polyepoxide resin, dimer fatty acids and an organic polyisocyanate, wherein the modified polyepoxide resin has a weight average molecular weight of 1000 to 50,000; and
b. at least one amino functional silane crosslinking agent;
wherein the coating composition preferably contains pigments and has excellent adhesion to aluminum and aluminum alloy substrates and provides excellent corrosion resistance and is particularly useful as a primer for such substrates.

17 Claims, No Drawings

SOLVENT-BORNE TWO COMPONENT MODIFIED EPOXY/POLYAMINE COATING COMPOSITION

CROSS-REFERENCE TO RELATED APPLICATION

This application claims priority under 35 U.S.C. §119 from U.S. Provisional Application Ser. No. 60/416,053 (filed Oct. 4, 2002), which is incorporated by reference herein as if fully set forth.

BACKGROUND OF THE INVENTION

1. Field of the Invention

This invention is directed to a coating composition, in particular, to a coating composition having excellent corrosion resistance and good adhesion to aluminum or aluminum alloy substrates.

2. Description of the Prior Art

Modified epoxy resins crosslinked with amino silanes that are used to form primer coatings on aluminum substrates with improved flexibility and resistance to Skydrol® hydraulic fluid are disclosed in Noren et al. U.S. Pat. No. 4,520,144 issued May 28, 1985. The improved flexibility of the primer coating is provided by the isocyanate containing polysiloxane prepolymer that is post reacted with a low molecular weight epoxy resin. This post reaction step is a relatively long time consuming step and does not provide the rapid ambient cure currently required in a typical modern automotive, truck, bus or OEM (original equipment manufacturing) fleet market operation.

There is a need for a rapid curing composition that has excellent adhesion to untreated aluminum or aluminum alloy substrates that provides a flexible finish and has the properties that meet current requirements of the transportation industry both in the OEM market and in the refinish aftermarket. The novel composition of this invention meets these requirements.

SUMMARY OF THE INVENTION

A coating composition comprising a film forming binder of a. a modified polyepoxy resin comprising the reaction product of a polyepoxide resin, dimer fatty acids and an organic polyisocyanate, wherein the modified polyepoxide resin has a weight average molecular weight of 1000 to 50,000; and b. at least one amino functional silane crosslinking agent;

wherein the coating composition preferably contains pigments and has excellent corrosion resistance and is particularly useful as a primer for aluminum and aluminum alloy substrates.

DETAILED DESCRIPTION OF THE INVENTION

The novel coating composition of this invention preferably is a solvent-borne composition containing a film forming binder of a modified polyepoxy resin that is the reaction product of a polyepoxide resin, dimer fatty acids and an organic polyisocyanate and at least one amino functional silane crosslinking agent. The modified polyepoxide resin has a weight average molecular weight of 1,000 to 50,000 determined by gel permeation chromatography using polystyrene as a standard. Preferably, the coating composition contains pigments.

A typical auto, truck or bus body has a number of parts, such as, trim parts, wheel rims, and decorative parts that are made of aluminum and aluminum alloys. These parts, particularly when they are on the exterior, require a protective coating to prevent tarnishing, corrosion and pitting caused by the environment, for example, acid rain, by typical mechanical washing procedures or under typical use conditions, for example, where the part is repeatedly handled. The coating composition of this invention has excellent adhesion to aluminum and aluminum alloy substrates and provides excellent corrosion protection and when pigmented can be used as a primer on these aluminum substrates and other metal substrates, such as, steel. The composition can be cured at ambient temperatures in a relative short period of time making it particularly useful in OEM manufacturing of vehicles and parts and useful in refinishing vehicles and parts.

The composition contains a modified polyepoxy resin as the primary film forming component that is crosslinked with at least one amino-functional silane and optionally, additional amino compounds are used. The modified polyepoxy resin is the reaction product of a polyepoxide resin, dimer fatty acids and an organic polyisocyanate and the resulting modified epoxy resin has reactive terminal epoxy groups.

Typically, the modified polyepoxy resin is prepared by reacting an epoxy resin, such as, the diglycidyl ether of polyhydroxylphenol in the presence of a catalyst and solvent with dimer fatty acids and the resulting composition subsequently is reacted with an organic polyisocyanate. Typically, the molar ratio of epoxy/dimer acid is in the range of 1.3 to 2.0 or higher if a high molecular weight epoxy reins is used, for example, having an EEW (epoxy equivalent weigh) of greater than 400 g. The polyisocyanate provides an increase in the epoxy functionality of the resulting modified polyepoxy resin by reacting with two or more essentially linear and bifunctional epoxy/dimer acid prepolymers through the OH groups. These OH groups can be the result of an epoxy ring opening and also can stem from higher molecular weight epoxy resins, such as, DER® 661 or Epikote® 1001. The ratio of isocyanate groups to hydroxyl groups when forming the modified polyepoxy resin should be kept at a low level; typically, between 0.15 and 0.30 to keep the urethane content of the polymer at a low level. Properties of the modified polyepoxy resin, such as, solubility can be adversely affected by a high urethane content.

In preparation of the modified polyepoxy resin, the above constituents typically are reacted for 0.5–5.0 hours at a temperature of 60–175° C. The resulting modified polyepoxy res average of 1000–50,000, preferably 2,000–20,000.

Typical catalysts that can be used to form the modified polyepoxy resin include dibutyl tin dilaurate, dibutyl tin diacetate, dibutyl tin dichloride, dibutyl tin dibromide, triphenyl boron, tetraisopropyl titanate, triethanolamine titanate chelate, dibutyl tin dioxide, dibutyl tin dioctoate, tin octoate, aluminum titanate, aluminum chelates, zirconium chelate, hydrocarbon phosphonium halides, such as, ethyl triphenyl phosphonium iodide and other such phosphonium salts, and other catalysts or mixtures thereof known to those skilled in the art.

Typical epoxy resins that are used are the diglycidyl ethers of a polyhydroxy phenol. These are usually the reaction product of epichlorohydrin with the polyhydroxylphenol, such as, bisphenol A, bisphenol F, trihydroxy diphenyl dimethyl methane, 4,4'-dihydroxy biphenyl and the like.

Other polyhydric organic compounds are also useful, such as, ethylene glycol, 2,3-butane diol, glycerol and the like. Typically useful epoxy resins that are commercially available that can be used are Epon®, Eponol®, Epikote®, each sold by Shell Chemical Co., D.E.R.®, D.E.N.®, D.E.H.®, Tactix®, Quatrex®, each sold by Dow Chemical Co., Araldite® sold by CIBA-GEIGY Corp., Epotuf®, Kelpoxy®, each sold by Dainippon Ink and Chemicals and Unox® sold by Union Carbide Co.

Preferred are the diglycidy ethers of bisphenol A having an EEW (epoxy equivalent weight) of at least 180, in particular Epon® 828 having an EEW of 185–192) and Epon® 1001 having an EEW of 450–550. More preferably, a mixture of Epon® 828 and Epon® 1001 is used in a weight ratio of approximately 1:2 to 2:1.

Other epoxy resins that can be used are epoxy novolak resins, epoxy phenol-novolak resins and cycloaliphatic epoxy resins.

The dimer fatty acids used to form the modified polyepoxy resin are dimers of unsaturated higher fatty acids that are obtained by dimerizing fatty acids that have from 4 to 22 carbon atoms and terminal carboxyl groups. These fatty acids can be derived from natural plant oils, for example, safflower oil, soybean oil, linseed oil, or tall oil. These oil typically contain oleic acid, linoleic acid, linolenic acid and any mixtures of these acids. Other useful dimer acids are disclosed in Nakayema et al. U.S. Pat. No. 5,942,329, col. 6, lines 22–58 which disclosure is hereby incorporated by reference.

Typically, dimer acids are prepared by polymerizing (dimerizing) mono fatty acids under pressure and then removing most of the un-reacted mono fatty acids by distillation. The final dimer acid product usually contains mainly dimer acids and some mono fatty acids and some trimer and higher fatty acids. The ratio of dimer acids to higher acids is variable and depends on the process conditions and the mono fatty acid feed stock used. The dimer acids may be further process by, for example, hydrogenation, which reduces the degree of un-saturation and the color of the dimer acid or by distillation to purify the dimer acid content.

Preferred are thirty six carbon (C36) dimer acids obtained by the dimerization of unsaturated C18 acids, such as, oleic acid, linoleic acid and mixtures thereof, e.g. tall oil fatty acid. Such dimer acids have as the principal component a C 36 dicarboxylic acid and typically have an acid value in the range of 180–215, saponification value in the range of 190–205 and neutral equivalent from 265–310. These dimer acids are commercially available as Empol® 1014, Empol® 1016 Empol®0.1018 from Emery Industries, Inc., Cincinnati, Ohio. It should be recognized that most or all commercially available dimer acids contain some portion of trimer acids and possibly higher acids, for example, in amounts of 5–10% by weight but in some cases as much as 30% by weight and may also contain small portions of mono-carboxylic acids. As used herein, the term "dimer acid" includes such amounts of these materials.

Typically useful organic polyisocyanates that can be used are aliphatic polyisocyanates, cycloaliphatic polyisocyanates and aromatic polyisocyanates.

Examples of suitable aliphatic and cycloaliphatic polyisocyanates that can be used include aliphatic or cycloaliphatic di-, tri- or tetra-isocyanates, such as, 1,2-propylene diisocyanate, 2,3-butylene diisocyanate, hexamethylene diisocyanate, octamethylene diisocyanate, 2,2,4-trimethyl hexamethylene diisocyanate, dodecamethylene diisocyanate, omega-dipropyl ether diisocyanate, 1,3-cyclopentane diisocyanate, 1,2 cyclohexane diisocyanate, 1,4 cyclohexane diisocyanate, isophorone diisocyanate, 4-methyl-1,3-diisocyanatocyclohexane, dicyclohexylmethane-4,4'-diisocyanate, 3,3'-dimethyl-dicyclohexylmethane 4,4'-diisocyanate, polyisocyanates having isocyanurate structural units, such as, the isocyanurate of hexamethylene diisocyanate and the isocyanurate of isophorone diisocyanate, the adduct of 2 molecules of a diisocyanate, such as, hexamethylene diisocyanate, uretidiones of hexamethylene diisocyanate, uretidiones of isophorone diisocyanate and a diol, such as, ethylene glycol, the adduct of 3 molecules of hexamethylene diisocyanate and 1 molecule of water, allophanates, trimers and biurets of hexamethylene diisocyanate, allophanates, trimers and biurets of isophorone diisocyanate and the isocyanurate of hexane diisocyanate. One preferred polyisocyanate is isophorone diisocyanate. Isocyanate functional adducts can be used, such as, an adduct of an aliphatic polyisocyanate and a polyol. Also, any of the aforementioned polyisocyanates can be used with a polyol to form an adduct. Polyols, such as, trimethylol alkanes, particularly, trimethylol propane or ethane can be used.

Aromatic polyisocyanate, such as, toluene diisocyanate, xylene diisocyanate, methylene diphenyl diisocyanate, can be used but generally are not suitable for resins use in coatings or primers since the aromatic polyisocyanates tend to reduce the solubility of the modified polyepoxy resin.

The composition contains an aminofunctional silane crosslinking agent or curing agent usually in an amount of 0.1 to 20% by weight, based on the weight of the binder; preferably 0.5–3.5% by weight of silane is used. Typically useful aminofunctional silanes have the formula

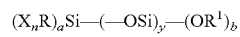

wherein X is selected from the group of $-NH_2$, $-NHR^2$, and SH, n is an integer from 1–5, R is a hydrocarbon group contain 1–22 carbon atoms, $R^1$ is an alkyl group containing 1–8 carbon atoms, a is at least 1, y is from 0–20, b is at least 2 and $R^2$ is an alkyl group having 1–4 carbon atoms.

Typically useful aminofunctional silanes are aminomethyltriethoxysilane, gamma-aminopropyltrimethoxysilane, gamma-aminopropyltriethoxysilane, gamma-aminopropylmethyldiethoxysilane, gamma-aminopropylethyldiethoxysilane, gamma-aminopropylphenyldiethoxyysilane, N-beta (aminoethyl)gamma-aminopropyltrimethoxysilane, delta-aminobutyltriethoxysilane, delta-aminobutylethyldiethoxysilane and diethylene triamino propylaminotrimethoxysilane. Preferred are N-beta(aminoethyl)gamma-aminopropyltrimethoxysilane commercially sold as Silquest® A 1120 and diethylene triamino propylaminotrimethoxysilane that is commercially sold as Silquest® A 1130. Both of theses silanes are sold by OSi Specialties, Inc. Danbury, Conn.

Additional amino functional curing agents, such as, primary, secondary and tertiary amines, that are well known in the art can be added. Typically, aliphatic amines containing a primary amine group, such as, diethylene triamine, and triethylene tetramine can be added. Tertiary amines, such as, tris-(dimethyl aminomethyl)-phenol can also be used.

Any of the known organic solvents may be used to form the modified polyepoxy resin and to form the coating composition. Typical solvents include aromatic hydrocarbons, such as, toluene, xylene; ketones, such as, acetone, methyl ethyl ketone, methyl isobutyl ketone, and diisobutyl ketone; esters, such as, ethyl acetate, n-butyl acetate, isobutyl acetate; alcohols, such as, ethanol, propanol, isopropanol, butanol, isobutanol, tertiary butanol, and diacetone alcohol.

The novel composition typically has a solids content of 30 to 70% by weight and preferably, 40 to 60% by weight. The novel composition may be at 100% solids by using a low molecular weight modified polyepoxy resin and optionally, reactive diluents.

An advantage of the coating composition of this invention is that it has a low VOC (volatile organic content) and can readily be formulated to have a VOC of less than 334 g/l (2.8 pounds per gallon) and in particular can be formulated to a VOC less than 240 g/l (2 pound per gallon) that meets current governmental air pollution regulations.

Typically, the composition contains pigments in a pigment to binder weight ratio of 1/100 to 300/100. When the composition is used as a primer, conventional primer pigments are used in a pigment to binder weight ratio of 50/100 to 250/100. Typical of such pigments are titanium dioxide, zinc phosphate, iron oxide, carbon black, amorphous silica, high surface area silica, barium sulfate, chromate pigments for corrosion resistance, such as, calcium chromate, strontium chromate, zinc chromate, magnesium chromate and barium chromate; metallic flakes and powders, such as, aluminum flake and aluminum powders; special effects pigments, such as, coated mica flakes, coated aluminum flakes colored pigments may also be used.

If the coating composition is to be used as an exterior coating that is subject to weathering, weatherability of the coating can be improved by the addition of an ultraviolet light stabilizer or a combination of ultraviolet light stabilizers in the amount of 0.1% to 10% by weight, based on the weight of the binder. Such stabilizers include ultraviolet light absorbers, screeners, quenchers, and specified hindered amine light stabilizers. An antioxidant also can be added, in the amount of 0.1% to 5% by weight, based on the weight of the binder.

Typical ultraviolet light stabilizers that are useful include benzophenones, triazoles, triazines, benzoates, hindered amines and mixtures thereof. Specific examples of ultraviolet stabilizers are disclosed in U.S. Pat. No. 4,591,533, the entire disclosure of which is incorporated herein by reference. For good durability, a blend of Tinuvin® 928 and Tinuvin®123 (hindered amine light stabilizers), all commercially available from Ciba Specialty Chemicals, Tarrytown, N.Y. is preferred.

The coating composition may also include other conventional formulation additives, such as, wetting agents, leveling and flow control agents, for example, Resiflow®S (polybutylacrylate), BYK® 320 and 325 (high molecular weight polyacrylates), BYK® 347 (polyether-modified siloxane) and rheology control agents, such as, fumed silica.

The coating composition is typically a two component composition and the two components are mixed together shortly before application. The first component contains the modified polyepoxy resin and pigments. The pigments are dispersed in the modified epoxy resin and optional solvents using conventional dispersing techniques, such as, ball milling, sand milling attritor grinding, and the like. The second component contains the amino functional silane crosslinking agent and optionally, additional amine curing agents and solvents.

The coating composition can be applied by conventional techniques, such as, spraying, electrostatic spraying, dipping, brushing, and flow coating. Typically, the coating is applied to a dry film thickness of 5–500 microns and preferably, 5 to 40 microns, and more preferably, 15 to 25 microns. The coating can be cured at ambient temperatures and can be force cured at elevated temperatures of 50–150° C. to decrease the curing time.

Particular advantages of the coating composition of this invention is that it forms finishes having a high level of flexibility, good adhesion to metal substrates and in particular to untreated aluminum and aluminum alloy substrates, provides good filling of surface imperfections, excellent filiform corrosion protection and improved acid etch resistance, i.e., provides protection against chemical surface etching caused by acid rain. Also the coating composition has a good cure response at ambient temperatures and excellent cure response at elevated temperature curing conditions.

Testing Procedures Used in the Examples

20° Gloss—test method ASTM D523—a rating of at least 80 is an acceptable minimum.

DOI—distinctness of image—test method ASTM D5767—a rating of at least 80 is an acceptable minimum.

Dry Film Thickness—test method ASTM D4138—0.6 to 1.0 mils (15 to 25 microns) for primer, 1.8 to 2.2 mils (45 to 55 microns) for topcoat, 2.4 to 3.2 mils (60 to 80 microns) for total film thickness.

Tape Crosshatch Adhesion—test method ASTM D3359—method B, determines initial adhesion/crosshatch test (Ratings 0–5 where 0 shows a complete failure of the coating adhesion and 5 shows no loss of adhesion). Minimum acceptable adhesion rating is 3.

Gravelometer—test method ASTM SALJ400/D3170, a panel is conditioned for 1 hour at −17.8° C. prior to testing (rating 1–10, where 1 is complete chipping off of paint and 10 is no noticeable chipping; size of chips are rated as follows: A<1 mm, B 1–3 mm, C 3–6 mm, D>6 mm). The panel must have a rating of 5A/6B to be acceptable.

Humidity Test—evaluation of adhesion and humidity blistering—test method ASTM D2247, D3359, D1654, D714. Coated panels are exposed to humidity for 1000 hours and checked after each 250 hour period. Adhesion ratings used are described in ASTM D3359 (Method B). Same rating method and acceptance level as for the above initial adhesion is used. Blistering ratings used are described in ASTM D714 (rating and frequency of blisters). Size of blisters—numerical scale 10 to 0, where 10 represents no blistering, 8 the smallest size blister easily seen with the unaided eye, 6, 4, and 2 represent progressively larger blisters. Frequency of blisters is described in the following four levels: Dense (D), Medium Dense (MD), Medium (M), and Few (F).

Salt Spray Test—test method ASTM D3359, B117, D1654, D 714. Coated panels are scribed down center of the panel and exposed for 1000 hours to salt spray and checked after each 250 hour period. Ratings used are described in ASTM D1654 and rates the creepage of coating adhesion loss from scribe (rating 0–10 where 10 shows zero loss of adhesion at the scribe and 0 is a complete failure of the coating). Scribe creepage is defined as "one sided", that is, from the original scribe line to the creepage front. Rating of failure at the scribe is measured in millimeters, where a rating of 10 (0 mm creepage), 9 (0–0.5 mm), 8 (0.5–1.0 mm), 7 (1.0–2.0 mm), 6 (2.0–3.0 mm), 5 (3.0–5.0 mm), 4 (5.0–7.0 mm), 3 (7.0–10.0 mm), (10.0–13.0 mm), 1 (13.0–16.0 mm) and 0 (16.0 mm and above). Minimum acceptable rating is 5. Blistering ratings are the same for size and frequency as set forth in the above humidity test.

The following examples illustrate the invention. All parts and percentages are on a weight basis unless otherwise indicated. Molecular weights are determined by GPC (Gel Permeation Chromatography) using polystyrene as the standard. The VOC of the coating composition is determined in accordance with the procedure of EPA Method 24.

EXAMPLES

Example 1

A modified epoxy resin was prepared by charging the following constituents into a 12 liter reactor equipped with an addition funnel, dual Claisen Heads, a heating source, a nitrogen inlet and a thermowatch:

| Description of Material | Parts by Weight |
|---|---|
| Portion 1 | |
| Epon ® 1001 (epoxy resin from Shell Chemical Company of diglycidyl ether of bisphenol A having an EEW* of 450–550) | 1972.10 |
| Epon ® 828 (epoxy resin from Shell Chemical Company of the diglycidyl ether of bisphenol A having an EEW* of 185–192) | 2504.20 |
| Catalyst (ethyl triphenylphosphonium iodide) | 13.80 |
| Cyclohexanone | 1992.40 |
| Portion 2 | |
| Empol ® 1016 (dimerized fatty acid of a C18 carboxylic acid mixture of 76–78% dimer, 13–18% trimer and 0–6% monomeric acids) | 1490.90 |
| Portion 3 | |
| Methyl ethyl ketone | 569.50 |
| Portion 4 | |
| Dibutyl tin dilaurate | 0.60 |
| Toluene | 61.40 |
| Portion 5 | |
| Methyl isobutyl ketone | 50.00 |
| Portion 6 | |
| Isophorone diisocyanate | 257.90 |
| Methyl isobutyl ketone | 621.00 |
| Portion 7 | |
| Methyl isobutyl ketone | 50.00 |
| Portion 8 | |
| Isopropanol | 16.20 |
| Total | 9600.00 |

*EEW—epoxy equivalent weight

Portion 1 was charged into the reactor and heated to 119–121° C. using the thermowatch and held at this temperature until all solids were completely melted. Portion 2 was charged into the reactor and heated slowly to 149–151° C. for 1 hour and tested for viscosity and acid no. and testing was continued every 30 minutes until a steady viscosity and an acid no. below 1 was reached at 75% reactor solids. Portion 3 was charged into the reactor and the reactor was cooled to 84–86° C. Portion 4 was premixed and charged into the reactor that was being held at the above temperature. Portion 5 was used to rinse and flush the reactor. Portion 6 was premixed and fed to the reactor over 60 minutes at a rate of 14.65 g/min. while the reactor was held at 84–86° C. and the resulting reaction mixture was held at this temperature for 30 minutes and tested for viscosity and continued to be held at this temperature until the viscosity was in the range of Y–Z1 (Gardner Holdt Viscosity). Portion 7 was used to rinse and flush the reactor and the reactor was cooled to 79–81° C. and then Portion 8 was added.

The resulting modified epoxy polymer solution has a weight solids of 65.34, a Gardner Holdt Viscosity of Y+1/2, Color of 4, Cloud of 4.34, EEW 898 and a Gallon Weight (#/gal.) 8.62.

A two component coating composition was prepared by first forming Components A and B and then mixing the components together to form the composition.

Preparation of Component A (Pigmented Composition)

| Description of Material | Parts by Weight |
|---|---|
| Modified Epoxy Resin (prepared above) | 34.55 |
| Anti-Terra U-80 (salt of a long chain polyamine-amide and high molecular weight ester) | 0.30 |
| Methyl isobutyl ketone | 16.35 |
| Diacetone alcohol | 5.00 |
| Strontium chromate pigment | 18.85 |
| Micronized barytes pigment | 11.30 |
| Kaolin Clay | 10.40 |
| Titanium dioxide pigment | 2.80 |
| Aerosil ® pigment (high surface area silica pigment) | 0.45 |
| Total | 100.00 |

The above components are charged into a sand mill and ground to form a pigment dispersion. The resulting composition has a total solids content of 66.5%, binder solids content of 22.5%, total pigment 43.4%, pigment to binder weight ratio of 191/100, a VOC (#/gal) of 3.869 and a calculated gallon weight of 11.55 pounds.

Preparation of Component B (Activator and Reducer) Composition

| Description of Material | Parts By Weight |
|---|---|
| Isobutanol | 63.20 |
| Methyl isobutyl ketone | 27.00 |
| Dimethylaminoethylphenol | 3.50 |
| Amino functional silane - N-beta-(aminoethyl-gamma-aminopropyl trimethoxy silane) | 6.30 |
| Total | 100.00 |

The above components were thoroughly mixed together and the resulting composition has a total solids content of 9.8%, a binder solids of 9.8%, VOC (#/gal) of 6.079 and a calculated gallon weight (#/gal) of 6.74.

A coating composition AB was prepared by mixing 63.149 parts of Component A with 36.851 parts of Component B. The resulting coating composition has a total solids of 45.8%, binder solids of 18.1%, total pigment 27.7%, pigment to binder weight ratio of 153/100, a VOC (#/gal) of 4.956 and a calculated gallon weight of 9.14#.

The above prepared coating composition AB was applied by spraying onto a panel 1 of bare cold rolled steel and a panel 2 of bare aluminum substrate and the coating was cured at an ambient temperature. The resulting dry film thickness was in the range of 0.6–1.0 mils (15–25 microns). An Imron® 5000 (acrylic urethane) single stage topcoating (3.5 #/gal VOC) was spray applied to the above coated panels 1 and 2 and baked for 30 min. at 180° F. (83° C.). The resulting dry film thickness was 1.8–2.2 mils (45–55 microns). Tests were conducted on each of the panel and the results of the tests are shown in Table 1.

Control Panel 3 (cold rolled steel) and Control Panel 4 (bare aluminum) were prepared by spraying each of the panels with a commercial refinish filling wash primer (described below) and the resulting coating was cured at an ambient temperature. The resulting dry film thickness was in the range of 0.6 to 1.0 mils (15–25 microns). An Imron® 5000 (acrylic urethane) single stage topcoating (3.5 #/gal VOC) was spray applied to the above coated Control Panels 3 and 4 and baked for 30 min. at 180° F. (83° C.). The resulting dry film thickness was 1.8–2.2 mils (45–55 microns). Tests were conducted on each of the panels and the results of the tests are shown in Table 1.

Commercial refinish filling wash primer—formulated by mixing 615S (pigmented component) and 616S (reducer component) in a 1/1 volume ratio (weight ratio of 120 g of 615S/80 g of 616S) to form a composition having a total solids content of 28.43%, binder solids of 8.39%, pigment to binder weight ratio of 239/100, VOC (#/gal) 5.891 and a gallon weight (#/gal) of 5.42. The binder of the primer is a combination of phenolic/polyvinyl butyral/nitrocellulose resin. The pigment portion of 615S contains zinc chromate pigment in the amount of 5.3% on the total formula composition by weight. The reducer (616S) contains phosphoric acid in the amount of 2.2% by weight based the total formula weight.

Example 2

A two component coating composition was prepared by first forming Components C and D and then mixing the components together to form the composition.

Preparation of Component C (Pigmented Composition)

| Description of Material | Parts by Weight |
| --- | --- |
| Modified Epoxy Resin (prepared above) | 22.72 |
| BBP Plastizer (butyl benzyl phthalate) | 3.28 |
| Anti-Terra U-80 (Described in Example 1) | 0.59 |
| Acetone | 22.72 |
| Methyl amyl ketone | 6.91 |
| Titanium dioxide pigment | 5.47 |
| Zinc phosphate pigment | 16.16 |
| Iron oxide pigment | 4.26 |
| Carbon black pigment | 0.02 |
| Amorphous silica | 0.34 |
| Aluminum silicate pigment | 8.52 |
| Barium sulfate pigment | 9.01 |
| Total | 100.00 |

The above components are charged into a sand mill and ground to form a pigment dispersion. The resulting composition has a total solids content of 64.57%, binder solids content of 20.8%, pigment to binder weight ratio of 211/100, a VOC (#/gal) of 2.309 and a gallon weight (#/gal) of 11.15.

Preparation of Component D (Activator and Reducer) Composition

| Description of Material | Parts By Weight |
| --- | --- |
| Isobutanol | 28.06 |
| Dimethylaminoethylphenol | 7.91 |
| Propylene glycol methyl ether | 14.82 |
| Isopropanol | 29.65 |
| Methyl amyl ketone | 2.96 |
| Amino functional silane (described in Example 1) | 11.66 |
| VM & P Naphtha | 4.94 |
| Total | 100.00 |

The above components were mixed together and the resulting composition has a total solids content of 19.22%, a binder solids of 19.22%, VOC (#/gal) of 5.687 and a gallon weight of 7.04.

A coating composition CD was prepared by mixing 82.804 parts of Component C with 17.196 parts of Component D. The resulting coating composition has a total solids of 55.61%, binder solids of 20.05%, total pigment 35.56%, pigment to binder weight ratio of 177/100, a VOC (#/gal) 3.498 and a calculated gallon weight of 9.99 #.

The above prepared coating composition CD was applied by spraying onto a panel 5 of bare cold rolled steel and a panel 6 of bare aluminum substrate and the coating was cured at an ambient temperature. The resulting dry film thickness was in the range of 0.6–1.0 mils (15–25 microns). As in Example 1, an Imron® 5000 (acrylic urethane) single stage topcoating was spray applied to the above coated panels 5 and 6 and baked for 30 min. at 180° F. (83° C.). The resulting dry film thickness was 1.8–2.2 mils (45–55 microns). Tests were conducted on each of the panel and the results of the tests are shown in Table 1.

TABLE 1

| Tests | Panels 1/2 Invention Ex. 1 (Steel/Al) | Panels 3/4 Control (Steel/Al) | Panels 5/6 Invention Ex. 2 (Steel/Al) |
| --- | --- | --- | --- |
| 20° Gloss | 89/89 | 86/86 | 85/85 |
| DOI | 87/87 | 86/86 | 87/87 |
| Tape cross hatch adhesion | | | |
| Initial | 5/5 | 5/4 | 5/5 |
| (1000 hrs. humidity) | 5/5 | 4/0 | 4/5 |
| Gravelometer | 5C/9A | 4C/7B | 6B/9A |
| Salt Spray (scribe adhesion) | | | |
| (250 hrs.) | 7/9 | 2/3 | 5/9 |
| (1000 hrs.) | 5/8 | 0/0 | 3/6 |
| Blistering (1000 hrs.) Humidity | 10/10 | 4(D)/10 | 4(MD)/10 |
| Blistering (1000 hrs.) | 10/10 | 10/4(D) | 10/10 |

Summary of the data in Table 1: All of the Panels 1–6 had an acceptable gloss and DOI (distinctness of image). Panels 1, 2, 5 and 6 that represent Examples 1 and 2 (the invention) has acceptable initial tape cross hatch adhesion. Control Panels 3 and 4 also have acceptable initial tape cross hatch adhesion. After 1000 hours of exposure to humidity, Control Panel 4 (aluminum substrate) has unacceptable tape cross hatch adhesion for both adhesion and blistering. For the Gravelometer test, Panels 2, 5 and 6 (the invention) and Panel 4 (control) gave acceptable results while Panel 1 (invention) and Panel 3 (control) did not give acceptable Gravelometer results. In the Salt Spray test after 250 hours, Panels 1, 2, 5 and 6 (invention) gave acceptable while Panels 3 and 4 (control) did not give acceptable results. After 1000 hours exposure to the Salt Spray test, Panels 1,2, and 6 (invention) gave acceptable results while Panel 5 (invention) gave unacceptable results. Panels 3 and 4 (control) showed a complete failure. Steel Panel 3 (control) and Panel 5 (invention) have blistering at the scribe area.

The compositions of the invention (AB of Examples 1 and CD of Example 2) provided superior corrosion protection for untreated aluminum substrate which is difficult to achieve. The compositions of the invention can be used over untreated steel substrates but the performance under some conditions is not as good as over aluminum, especially for compositions that do not have chrome containing pigments as illustrated in Example 2 (composition CD). The compositions of the invention can be used as a pretreatment coating over steel and aluminum substrates.

The control Panels 3 and 4 used a commercial product 615S/616S which is a chromate containing coating composition. A comparison of the coating composition AB (invention) of Example 1 to the 615S/616S over both aluminum and steel substrates shows superior performance of coating composition AB (invention) for Tape cross hatch adhesion, initial and 1000 hours humidity exposure, Salt Spray scribe creep adhesion, 250 hours and 1000 hours exposure and humidity blistering 1000 hours exposure.

The composition of Example 2 (coating CD) that did not contain chromate pigments for corrosion reinforcement did show excellent performance over the aluminum substrate. Comparing Salt Spray data for 250 hours exposure for Panel 5 of the steel substrate coated with the Example 2 composition CD to Panel 3, the 615S/616S coated steel panel, showed a failure of this 615S/616S composition while Panel 5, Example 2 composition (CD) without chromate pigments, still provided acceptable corrosion protection.

What is claimed is:

1. A coating composition comprising a film forming binder of
   a) a modified polyepoxy resin comprising the stepwise reaction product of a polyepoxide resin with dimer fatty acids in an epoxy to dimer acid mole ratio of greater than 1.3:1 followed by reaction with an organic polyisocyanate wherein the molar ratio of isocyanate groups to hydroxy groups is between 0.15:1 and 0.3:1 and, wherein the modified polyepoxy resin has a weight average molecular weight of 1000 to 50,000; and
   b) at least one amino functional silane crosslinking agent.

2. The coating composition of claim 1 containing up to 70% by weight of solvent.

3. The coating composition of claim 2 wherein the polyepoxide resin is a polyepoxy hydroxy ether resin having an epoxy equivalent weight average weight of at least 180 .

4. The coating composition of claim 2 wherein the dimer fatty acids comprise dimerized unsaturated higher fatty acids having 4–22 carbon atoms.

5. The coating composition of claim 4 wherein the unsaturated higher fatty acids are selected from the group consisting of unsaturated fatty acids from safflor oil, soybean oil, linseed oil, tall oil and mixtures thereof.

6. The coating composition of claim 2 wherein the polyisocyanate is selected from the group consisting of aliphatic polyisocyanates, cycloaliphatic polyisocyanates and aromatic polyisocyanates.

7. The coating composition of claim 6 in which the polyisocyanate consists of isophorone diisocyanate.

8. The coating composition of claim 2 wherein the aminofunctional silane has the formula

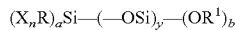

wherein X is selected from the group consisting of —$NH_2$,—$NHR^2$, and SH, n is an integer from 1–5, R is a hydrocarbon group contain 1–22 carbon atoms, $R^1$ is an alkyl group containing 1–8 carbon atoms, a is at least 1, y is from 0–20, b is at least 2 and $R^2$ is an alkyl group having 1–4 carbon atoms.

9. The coating composition of claim 8 wherein the aminofunctional silane is selected from the group consisting of N-beta-(aminoethyl)gamma-aminopropyl trimethoxy silane and diethylene triamino propylaminotrimethoxy silane.

10. The coating composition of claim 8 containing an at least one additional amino functional compound selected from the group consisting of primary amines, secondary amines and tertiary amines.

11. The coating composition of claim 2 containing pigments in a pigment to binder weight ratio of 1/100 to 300/100.

12. The coating composition of claim 11 wherein the pigments are selected from the group consisting of titanium dioxide, iron oxide, silica, carbon black, baryte, zinc oxide, aluminum silicate, barium sulfate, zinc phosphate, lead silicate, clay and any mixtures thereof.

13. The coating composition of claim 1 comprising 30 to 70% by weight organic solvent and pigments in a pigment to binder weight ratio of 50/100 to 200/100;
   wherein polyspoxide resin is a polyepoxy hydroxy ether resin having an epoxy equivalent weight of at least 180;
   the dimer fatty acids comprise dimerized unsaturated higher fatty acids having 4–22 carbon atoms;
   the polyisocyanate is selected from the group consisting of aliphatic diisocyanate, cycloaliphatic diisocyanates and aromatic diisocyanates;
   the aminofunctlonal silane has the formula

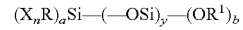

wherein X is selected from the group consisting of —$NH_2$, —$NHR^2$, and SH, n is an integer from 1–5, R is a hydrocarbon group contain 1–22 carbon atoms, $R^1$ is an alkyl group containing 1–8 carbon atoms, a is at least 1, y is from 0–20, b is at least 2 and $R^2$ is an alkyl group having 1–4 carbon atoms and
   contains an at least on additional amino functional compound selected from the group consisting of primary amines, secondary amines and tertiary amines.

14. A coated substrate which comprises a substrate coated with a layer of the coating composition of claim 1.

15. The coated substrate of claim 14 wherein the substrate is aluminum.

16. The coated substrate of claim 15 comprising a top coating selected from the group consisting of a clear coat/pigmented base coat and a pigmented topcoat.

17. A two component coating composition comprising
   Component A a modified polyepoxy resin comprising the reaction product of a polyepoxide resin with dimer fatty acids in an epoxy to dimer acid mole ratio of greater than 1.3:1, followed by reaction with an organic polyisocyanate in a molar ratio of isocyanate groups to hydroxyl groups of between 0.15:1 and 0.3:1, wherein the modified polyepoxy resin has a weight average molecular weight of 1000 to 50,000; and
   Component B at least one amino functional silane crosslinking agent;
   wherein Components A and B are thoroughly mixed together before application to a substrate.

* * * * *